United States Patent
Yanagi et al.

[11] Patent Number: 5,560,206
[45] Date of Patent: Oct. 1, 1996

[54] MASTER CYLINDER WITH RETURN SPRING

[75] Inventors: Kunio Yanagi; Riichirou Sugimoto, both of Higashimatsuyama, Japan

[73] Assignee: Jidosha Kiki Co., Ltd., Tokyo, Japan

[21] Appl. No.: 427,573

[22] Filed: Apr. 24, 1995

[30] Foreign Application Priority Data

Apr. 26, 1994 [JP] Japan .................. 6-087071

[51] Int. Cl.$^6$ .................. B60T 7/00; B01D 53/02
[52] U.S. Cl. .................. 60/568; 92/135
[58] Field of Search .................. 60/533, 561, 562, 60/568; 92/135

[56] References Cited

U.S. PATENT DOCUMENTS

| | | | |
|---|---|---|---|
| 3,686,864 | 8/1972 | Shutt | 60/562 X |
| 4,004,425 | 1/1977 | Pickering | 60/562 |
| 4,162,616 | 7/1979 | Hayashida | 60/533 |
| 4,201,054 | 5/1980 | Bainbridge | 60/562 |
| 4,224,727 | 9/1980 | Miyashita | 29/156.4 |
| 4,324,101 | 4/1982 | Farr | 60/562 |
| 4,356,694 | 11/1982 | Koshimuzu et al. | 60/561 X |
| 5,349,820 | 9/1994 | Yanagi et al. | 60/562 |

FOREIGN PATENT DOCUMENTS

| | | | |
|---|---|---|---|
| 58-160607 | 9/1983 | Japan | 60/562 |
| 1051512 | 12/1966 | United Kingdom . | |
| 1160332 | 8/1969 | United Kingdom . | |

Primary Examiner—John E. Ryznic
Attorney, Agent, or Firm—Patterson & Streets, L.L.P.

[57] ABSTRACT

An object of the present invention is to provide a master cylinder in which the buckling of spring is prevented and the packing is not damaged. To achieve this object, in a master cylinder in which a return spring is disposed between the end wall of a cylinder and a piston, and a packing fitted to the piston slides on the inner peripheral wall of the cylinder, the return spring 30 comprises a cylindrical large-diameter coil portion A with a diameter almost in contact with the inner peripheral wall of the cylinder 12 and a small-diameter coil portion B with a diameter enough smaller than the diameter of the inner peripheral wall of the cylinder 12, and the installation length of the small-diameter coil portion B is set so as to be nearly equal to a length of the range in which the packing 24 slides.

2 Claims, 5 Drawing Sheets

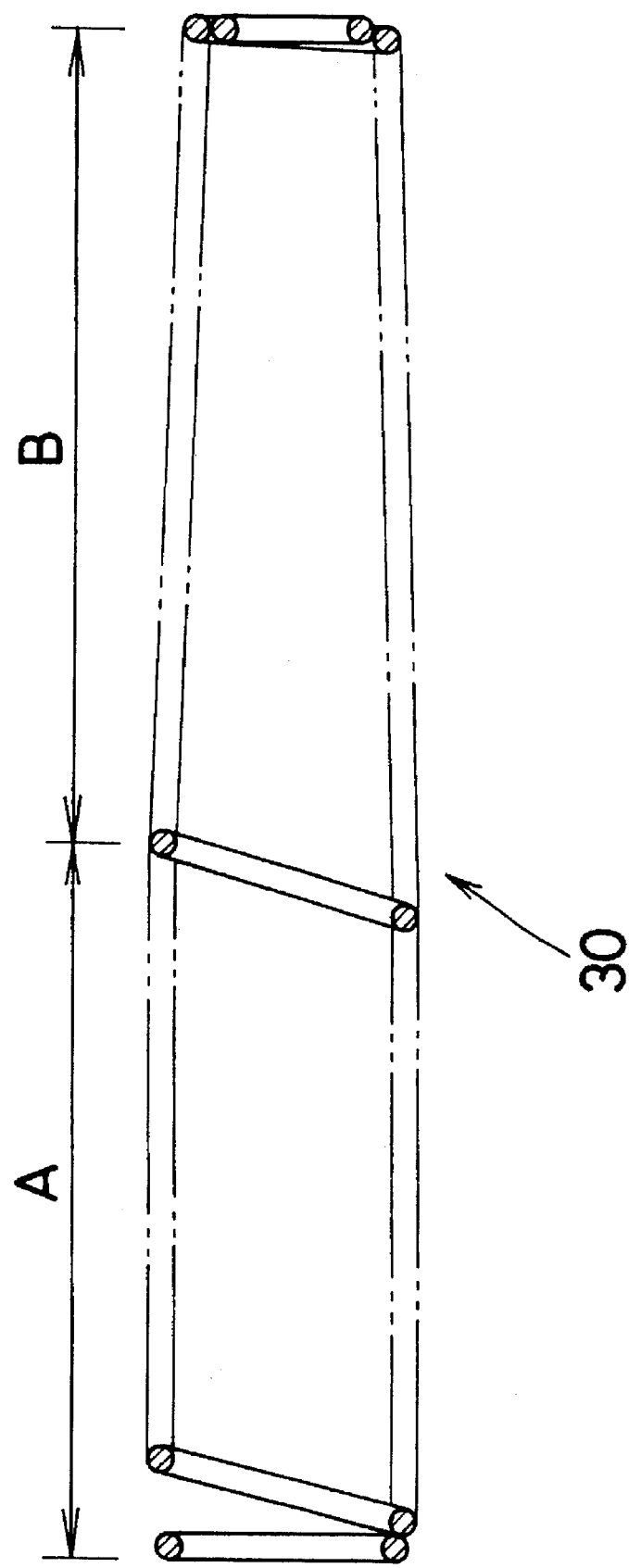

MASTER CYLINDER WITH RETURN SPRING

FIELD OF THE INVENTION AND RELATED ART STATEMENT

The present invention relates to a master cylinder used for brake devices and the like.

FIG. 4 shows a conventional master cylinder.

In this master cylinder, a primary piston 3 and a secondary piston 4 are arranged in series in a cylinder 2 of a housing 1, and two pressure chambers 5 and 6 are defined by these pistons 3 and 4 in the cylinder 2. Between the primary piston 3 and the secondary piston 4, and between the secondary piston 4 and the end wall 2a of the cylinder 2, return springs 7 and 8 are disposed, respectively.

In the master cylinder of this type, when the primary piston 3 is operated, the pressure chamber 5 is contracted. Further, the secondary piston 4 is also operated, by which the pressure chamber 6 is contracted. Therefore, the fluid in the pressure chambers 5 and 6 is fed under pressure to each wheel cylinder via ports 5a and 6a, respectively.

In the conventional master cylinder, the buckling of the return springs 7 and 8 need not practically be taken into consideration because the strokes of the pistons 3 and 4 are not so large.

However, when a large amount of fluid must be supplied to an actuating device such as a wheel cylinder on a large size vehicle, pressure chambers with a volume large enough to meet the need must be provided. In such a case, if an attempt is made to provide pressure chambers having a large volume without increasing the cylinder diameter, the strokes of the pistons increase, which creates the need for taking the buckling of return springs into consideration.

It is generally known that the buckling of a spring can be prevented by the increase in coil diameter and wire diameter or the installation of a guide.

However, if the cylinder diameter cannot be increased, the only way to prevent the buckling of spring is to install a guide.

For this purpose, it is possible to use the inner peripheral wall of the cylinder as a guide, but the inner peripheral surface of the cylinder is damaged by the repetition of the compression and return of spring. In the master cylinder, the packings 3a and 4a of the pistons 3 and 4 slide on the inner peripheral surface of the cylinder 2. Therefore, the flaws on the inner peripheral surface of the cylinder 2 may damage the packings 3a and 4a.

OBJECT AND SUMMARY OF THE INVENTION

An object of the present invention is to provide a master cylinder in which the buckling of spring is prevented and the packing is not damaged.

To achieve the above object, the present invention provides a master cylinder in which a return spring is disposed between the end wall of a cylinder and a piston, and a packing fitted to the piston slides on the inner peripheral wall of the cylinder, wherein the return spring comprises a cylindrical large-diameter coil portion with a diameter almost in contact with the inner peripheral wall of the cylinder and a small-diameter coil portion with a diameter enough smaller than the diameter of the inner peripheral wall of the cylinder, and the installation length of the small-diameter coil portion is set so as to be in the range from almost maximum stroke to almost ordinary stroke.

In the master cylinder in accordance with the present invention, although the piston is operated and the compression and return of the return spring are repeated, the return spring does not come in contact with the inner peripheral wall of the cylinder at least of the range in which the packing slides on the inner peripheral surface of the cylinder in the ordinary braking operation. Therefore, the packing is not damaged.

Also, since the large-diameter coil portion of the return spring is compressed and returned repeatedly while contacting with the inner peripheral wall of the cylinder, that is, while being guided by the inner peripheral wall of the cylinder, there is no possibility of producing buckling. Further, the length of the small-diameter coil portion, which is not guided, is short because it is the length obtained by subtracting the length of the large-diameter coil portion from the total length. Therefore, there is also no possibility of producing buckling of the small-diameter coil portion.

BRIEF DESCRIPTION OF THE DRAWINGS

FIG. 2 is a sectional view of a return spring used in a master cylinder in accordance with the present invention;

DETAILED DESCRIPTION OF PREFERRED EMBODIMENTS

Figure 1:
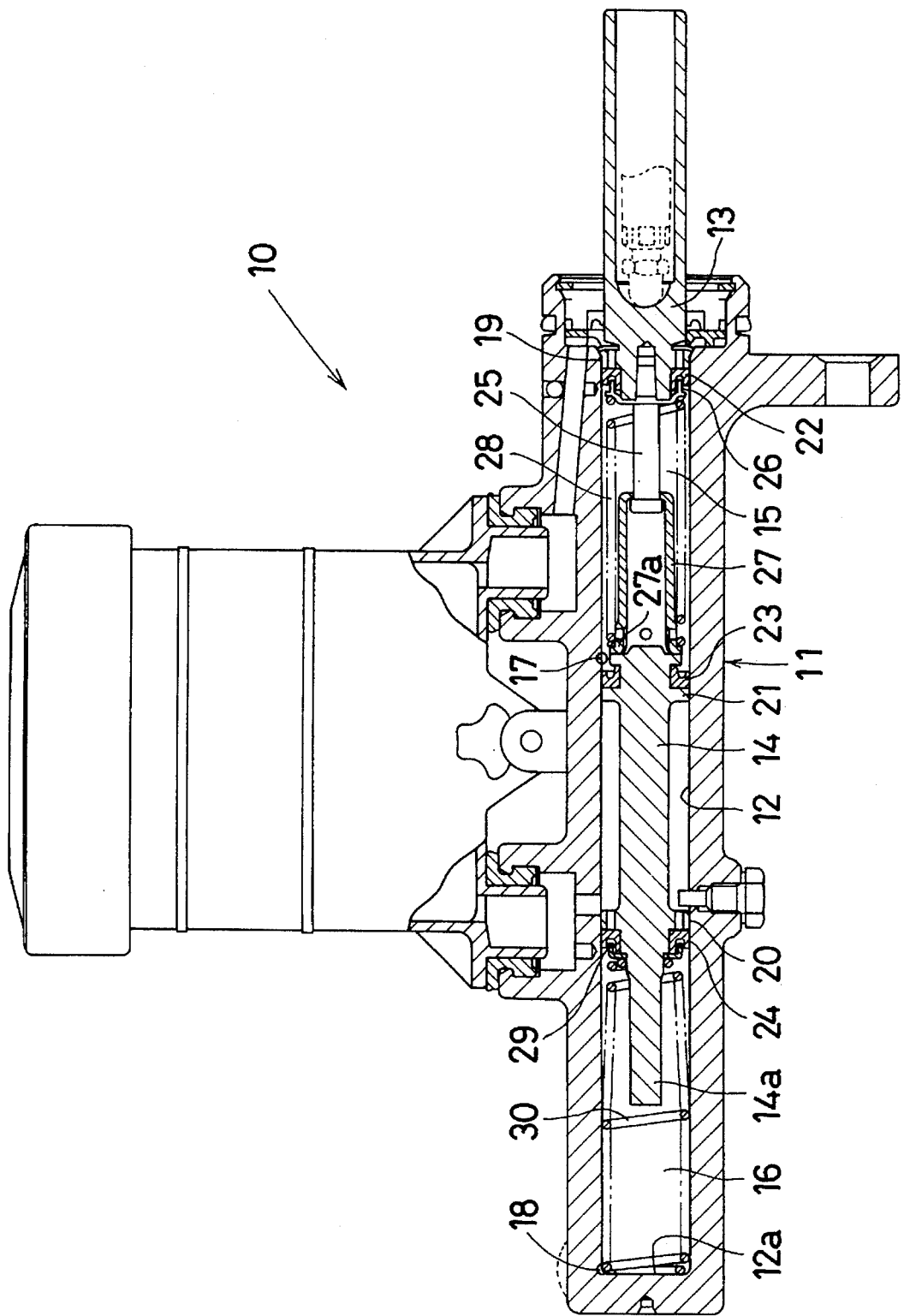
FIG. 1 is a longitudinal sectional view of a master cylinder in accordance with the present invention.

FIG. 1 shows a master cylinder in accordance with the present invention.

In this master cylinder 10, a primary piston 13 and a secondary piston 14 are disposed in a cylinder 12 of a housing 11, and a first pressure chamber 15 and a second pressure chamber 16 are defined by these pistons 13 and 14 in the cylinder 12. The first and second pressure chambers 15 and 16 are formed with ports 17 and 18, respectively. The ports 17 and 18 are connected to a wheel cylinder for each brake system or the like.

At the front end of the piston 13, a flange 19 is formed, while at the front and rear ends of the piston 14, flanges 20 and 21 are formed, respectively. To these flanges 19, 20 and 21, cup packings 22, 23 and 24 are attached.

At the front end of the primary piston 13 is installed a bolt 25. This bolt 25 supports a spring holder 26 at the front end of the piston 13. The cup packing 22 is held to the piston 13 by this spring holder 26.

The shank of the bolt 25 is inserted in a hole formed at one end of a retainer 27. The retainer 27 is formed into a cylindrical shape, and has a collar 27a on the other end. A return spring 28 is disposed between the collar 27a and the spring holder 26 so as to be almost in contact with the retainer 27.

At the front end of the secondary piston 14 is formed a column-shaped protrusion 14a, and a spring holder 29 is fitted to the protrusion 14a. The cup packing 24 is held to the secondary piston 14 by the spring holder 29.

A return spring 30 is disposed between the spring holder 29 and the end wall 12a of the cylinder 12. This spring 30, as shown in FIG. 2, consists of a cylindrical large-diameter coil portion A having a diameter almost in contact with the inner peripheral wall of the cylinder 12 and a conical small-diameter coil portion B the end portion of which has a diameter enough smaller than the diameter of the inner peripheral wall of the cylinder 12.

In the master cylinder of this type, when the primary piston 13 is operated, the pressure chamber 15 is contracted. Further, the secondary piston 14 is also operated, by which the pressure chamber 16 is contracted. Therefore, the fluid in the pressure chambers 15 and 16 is fed under pressure to each wheel cylinder Via ports 17 and 18, respectively.

At this time, the return springs 28 and 30 are compressed, but the buckling of the return spring 28 is prevented by the retainer 27, and the buckling of the large-diameter coil portion A of the return spring 30 is prevented by the inner peripheral wall of the cylinder 12. The small-diameter coil portion B of the return spring 30 does not come in contact with the inner peripheral wall of the cylinder 12. Therefore, the small-diameter coil portion B does not damage the inner peripheral wall of the cylinder 12.

Figure 3A:
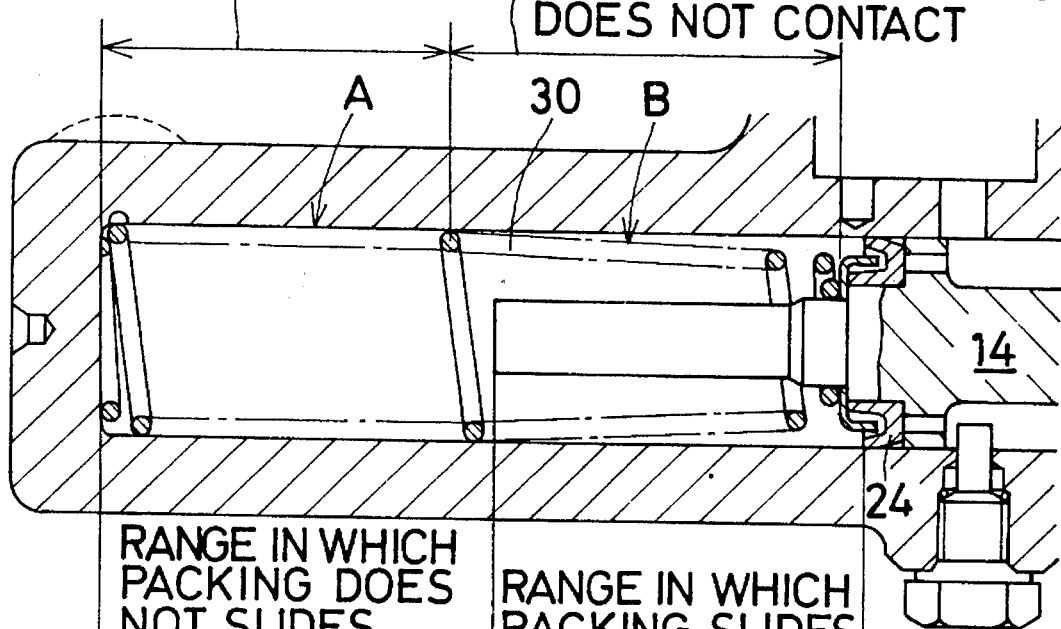
FIG. 3 is a sectional view of the principal portion of a master cylinder in accordance with the present invention, showing the inoperative state and the maximum piston stroke state by comparison.
Figure 3B:
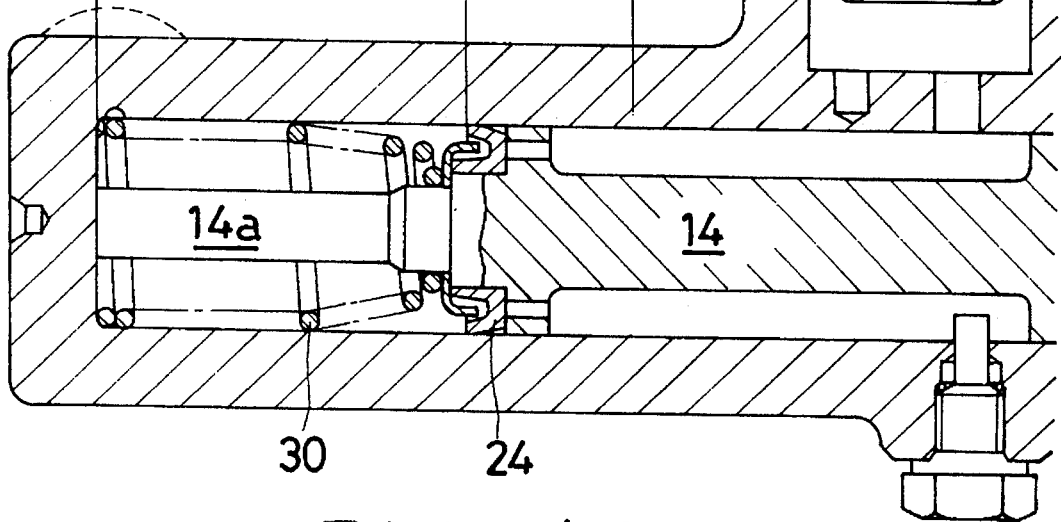
Figure 4:
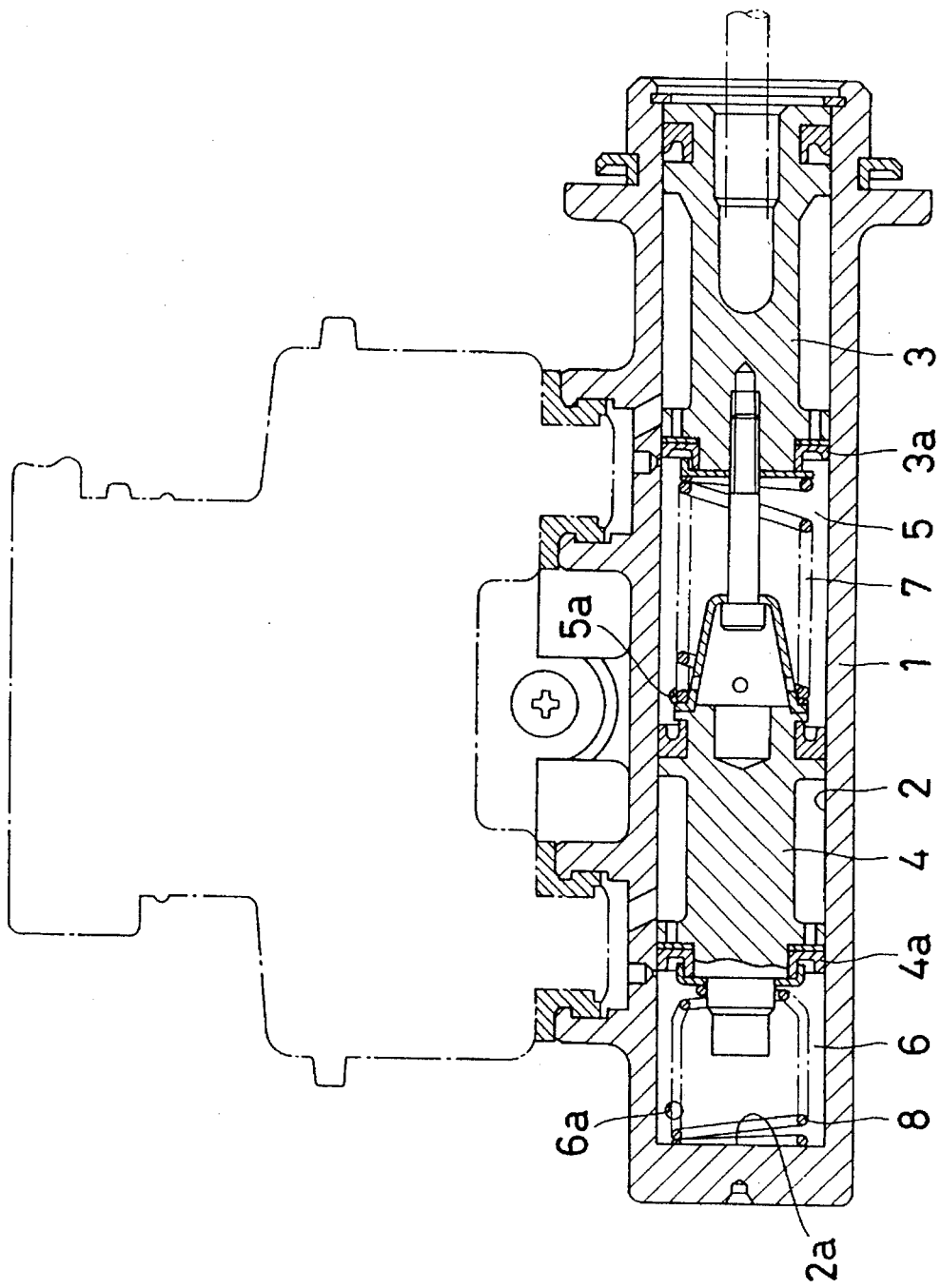
FIG. 4 is a longitudinal sectional view of a conventional master cylinder.

In the master cylinder 10 of this embodiment, as shown in FIG. 3(a), the return spring 30 is such that the installation length of the small-diameter coil portion B thereof is nearly equal to the maximum stroke of the cup packing 24 (piston 14). The reason for this is that since there is a slight distance between the position of the end of the return spring 30 and the position of the cup packing 24 as seen from FIG. 3(a), the position of the cup packing 24 at the maximum stroke of the piston 14 is always at the right from the position of the end on the small-diameter coil portion B side of the large-diameter coil portion A in the inoperative state of the master cylinder 10 as seen from FIG. 3(b). That is to say, the cup packing 24 does not reach the range in which the inner peripheral wall of the cylinder 12 may be damaged.

The maximum stroke of the piston 14 (cup packing 24) is needed for bleeding air in the pressure chamber 16. The ordinary stroke, that is, the stroke necessary for braking operation, is approximately one half of the maximum stroke. Actually, the inner peripheral wall of the cylinder 12 is scarcely damaged by the large-diameter coil portion A because the frequency of air bleeding is far lower than the frequency of ordinary braking operation. Therefore, when the inner peripheral wall of the cylinder 12 is strengthened by aluminization or other treatments, the installation length of the small-diameter coil portion B may be set so as to be nearly equal to the ordinary stroke of the piston 14.

It is preferable that the coil diameter of the large-diameter coil portion A and the inside diameter of the cylinder 12 be designed so that the coil diameter of the large-diameter coil portion A is slightly smaller than the inside diameter of the cylinder 12, in consideration of the machining error of these elements.

Figure 5:
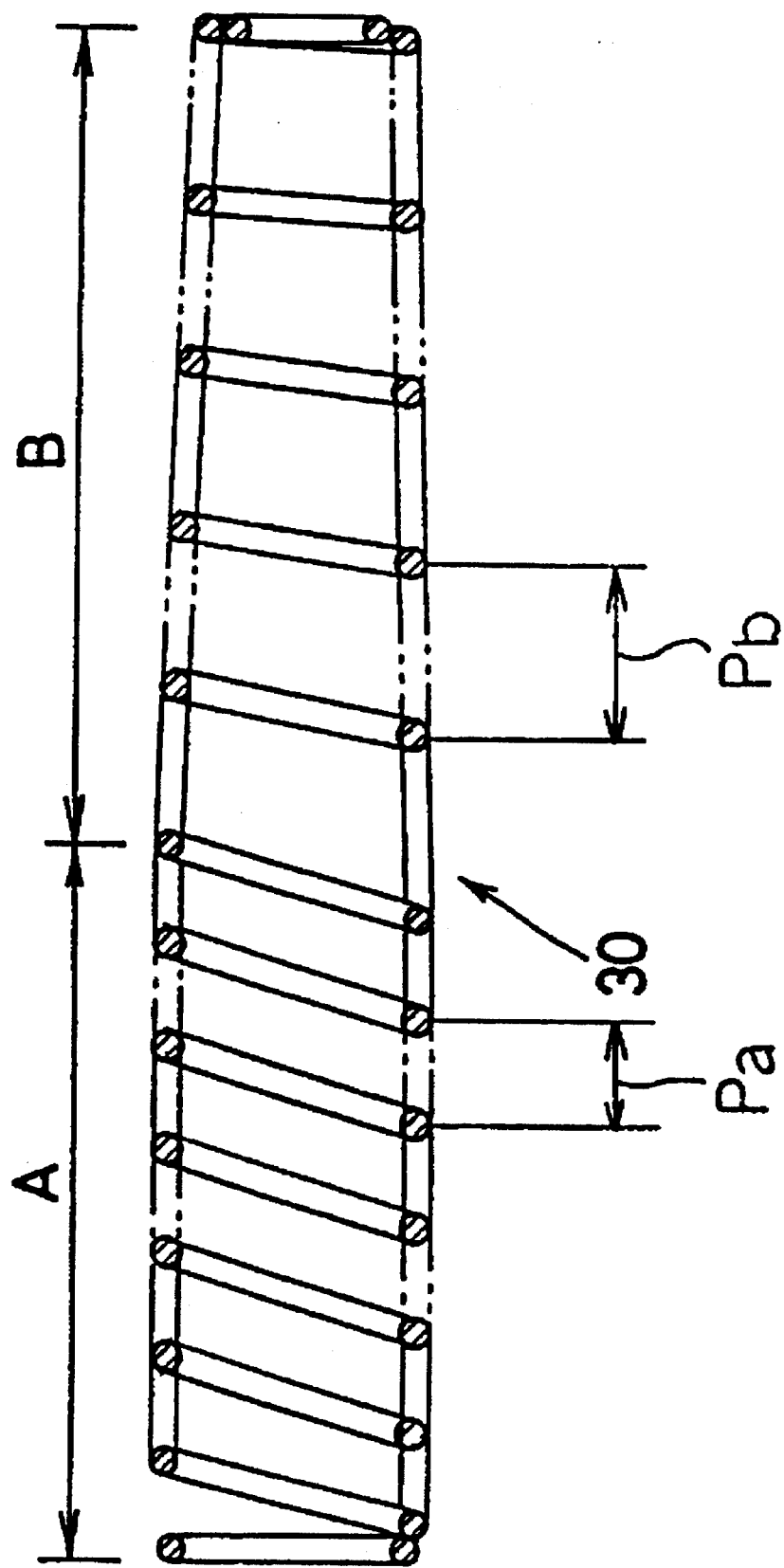
FIG. 5 is a cross-sectional view of a return spring used in a master cylinder in accordance with the present invention.

If the pitch of the large-diameter coil portion A is set so as to be smaller than that of the small-diameter coil portion B so that the coil of the large-diameter coil portion A is brought into contact during the stroke of the piston 14, the displacement at the large-diameter coil portion A decreases, thereby lessening the possibility of damaging the inner peripheral wall of the cylinder 12, as shown in FIG. 5.

Although the small-diameter coil portion B of the return spring 30 has been formed into a conical shape in the above embodiment, the small-diameter coil portion B may be formed into a cylindrical shape.

Also, although a tandem type master cylinder has been shown in the above embodiment, the present invention can, needless to say, be applied to a single type master cylinder.

As described above, in the master cylinder in accordance with the present invention, although the piston is operated and the compression and return of the return spring are repeated, the return spring does not come in contact with the inner peripheral wall of the cylinder at least of the range in which the packing slides on the inner peripheral surface of the cylinder in the ordinary braking operation. Therefore, the packing is not damaged. Also, since the large-diameter coil portion of the return spring is compressed and returned repeatedly while contacting with the inner peripheral wall of the cylinder, there is no possibility of producing buckling. Further, the length of the small-diameter coil portion is short because it is the length obtained by subtracting the length of the large-diameter coil portion from the total length. Therefore, there is also no possibility of producing buckling of the small-diameter coil portion.

We claim:

1. A master cylinder in which a return spring is disposed between the end wall of a cylinder and a piston, and a packing fitted to said piston slides on the inner peripheral wall of said cylinder, wherein said return spring comprises a cylindrical large-diameter coil portion with a diameter almost in contact with the inner peripheral wall of said cylinder and a small-diameter coil portion with a diameter enough smaller than the diameter of the inner peripheral wall of said cylinder, and the installation length of said small-diameter coil portion is set so as to be nearly equal to the maximum stroke of said piston.

2. A master cylinder according to claim (1), wherein the pitch of the small-diameter coil portion of said return spring is larger than the pitch of the large-diameter coil portion.

* * * * *